(12) United States Patent
Waddy

(10) Patent No.: US 7,806,085 B1
(45) Date of Patent: Oct. 5, 2010

(54) P.E.T. PT -PET EXERCISE TOY PHYSICAL THERAPY

(75) Inventor: Jude Michael Waddy, 124 New York Ave., #9, Brooklyn, NY (US) 11216

(73) Assignee: Jude Michael Waddy, Brooklyn, NY (US)

( * ) Notice: Subject to any disclaimer, the term of this patent is extended or adjusted under 35 U.S.C. 154(b) by 163 days.

(21) Appl. No.: 11/724,836

(22) Filed: Mar. 17, 2007

(51) Int. Cl.
*A01K 29/00* (2006.01)

(52) U.S. Cl. .................. 119/707; 119/702; 119/703; 119/704; 119/708

(58) Field of Classification Search .......... 119/702, 119/703, 704, 707, 708, 769, 784, 786, 787, 119/795, 796, 797, 798; 446/227, 486, 71–73, 446/75–77; 482/33
See application file for complete search history.

(56) References Cited

U.S. PATENT DOCUMENTS

| 1,527,716 | A | * | 2/1925 | Tippen et al. | 473/147 |
|---|---|---|---|---|---|
| 1,862,044 | A | * | 6/1932 | White | 473/429 |
| 2,725,853 | A | * | 12/1955 | Nordheim | 119/789 |
| 2,957,271 | A | * | 10/1960 | Heywood, Jr. | 446/227 |
| 3,123,052 | A | * | 3/1964 | Marshall | 119/789 |
| 3,415,475 | A | * | 12/1968 | Goodman | 248/158 |
| 3,665,892 | A | * | 5/1972 | Kusisto | 119/701 |
| 3,716,029 | A | * | 2/1973 | Pillsbury, Jr. | 119/701 |
| 3,727,583 | A | * | 4/1973 | Muraro | 119/711 |
| 4,609,197 | A | * | 9/1986 | Vodin | 473/144 |
| 4,921,373 | A | * | 5/1990 | Coffey | 405/115 |
| 5,022,351 | A | * | 6/1991 | Daniels | 119/789 |
| 5,322,036 | A | * | 6/1994 | Merino | 119/707 |
| 5,415,396 | A | * | 5/1995 | Huang | 473/417 |
| 5,575,241 | A | * | 11/1996 | Line | 119/708 |
| 5,634,436 | A | * | 6/1997 | Coombs et al. | 119/707 |
| 5,924,387 | A | * | 7/1999 | Schramer | 119/708 |
| 6,058,887 | A | * | 5/2000 | Silverman | 119/609 |
| 6,318,302 | B1 | * | 11/2001 | Bedient | 119/786 |
| 6,434,797 | B1 | * | 8/2002 | Sagman | 24/3.13 |
| 6,551,204 | B1 | * | 4/2003 | Di Re | 473/417 |
| 6,684,819 | B1 | * | 2/2004 | Locke | 119/707 |
| 6,892,675 | B1 | * | 5/2005 | Comerford | 119/708 |
| 7,273,428 | B2 | * | 9/2007 | James | 473/431 |
| 2007/0289550 | A1 | * | 12/2007 | Huang | 119/707 |

* cited by examiner

*Primary Examiner*—Timothy D Collins
*Assistant Examiner*—Justin Benedik
(74) *Attorney, Agent, or Firm*—Jude M Waddy

(57) ABSTRACT

An apparatus for any predatory animal having first a rigid base, comprising of a shape designed to return to a set position once interaction is terminated, as it directly applies to the function of said apparatus, and second a shaft housing a pulley mechanism to guide an internal retraction system for attachable/interchangeable amusement devices, third an internal hollow bladder, with the ability to be filled with various substances to increase the coefficient of friction on any given surface, and finally comprising of a "top piece" covering in no specific design, to cover and visually enhance said apparatus.

13 Claims, 5 Drawing Sheets

P.E.T. PT - PET EXERCISE TOY PHYSICAL THERAPY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

U.S. Patent Classification Class: 119/708

The current class of pet entertainment devices mostly human-animal interactive devices. None of the current devices offer the ability to exercise and entertain animals without direct human interaction. The scope of this invention provides a method for pets to get exercise in wide open space or confined areas, which is a growing problem for many of today's pets that reside in urban environments. So, I have endeavored to create such a device to provide an outlet for the built up energy and, boredom to enhance the quality of life for our pets. One such attempt by Willinger, U.S. Pat. No. 6,217,408, describes a self-righting pet toy made of a rubber base. This device does not adjust to the dimensions of many breeds of dogs and other animals. Such a device could easily allow the animal to loose focus on the toy and return to its destructive habits due to boredom and restlessness. Another type of pet toy is a Suspended dog amusement apparatus by Lonsway, U.S. Pat. No. 6,575,119, where a device is attached to a series of walls and ceilings to provide the "suspending" of the dog when interacting with the device. The problem with this configuration is that the device is confined to the walls and structure to produce the suspension. My device is mobile and adjustable, with the ability to adapt and incorporate whatever the target animal is currently interested in and can be changed with the change of the animals interest. Therefore, I believe there is a definite need for a product that occupies our pets and provides an outlet for the excess energy pets accumulate when "cooped up" indoors or in a yard alone while the owners are away.

BRIEF SUMMARY OF THE INVENTION

It is a feature of the present invention to provide a device designed primarily to be employed in conjunction with animals such as dogs or predatory animals to stimulate exercise and play. Briefly described according to the preferred embodiment of the present invention, a toy of this invention takes the form of a rigid base with a detailed, bottom surface to incorporate the coefficient of friction properties predicted and produce an expected result in performance when the animal pulls on one of the interchangeable attachments or "top piece" of the shaft covering. When the animal pulls on the stimulant attachment, it will extend. The force created by the pull of the animal will cause the attachment and the base to sway and rotate, stimulating the animal to play and exercise. Within the hollow base of the apparatus unused toys and accessories can be added to increase the static weight of the device changing the characteristics of the toy. Some portion of the base is in contact with the surface/water to provide resistance and friction. When there is no interaction, the base will return to a centered, upright position and remain stable until external stimulus provokes movement. The primary objective of this invention is to construct an animal toy that interacts with animals and for pets, stimulates exercise and play to reduce destructive tendencies from boredom and the pitfalls of poor health.

BRIEF DESCRIPTION OF THE SEVERAL VIEWS OF THE DRAWINGS

The advantages and features of the present invention will become better understood with reference to the following more detailed description(s) and claim(s) taken in conjunction with the accompanying images, in which like elements are identified with like symbols:

DETAILED DESCRIPTION OF THE PREFERRED EMBODIMENT OF THE INVENTION

Figure 1:
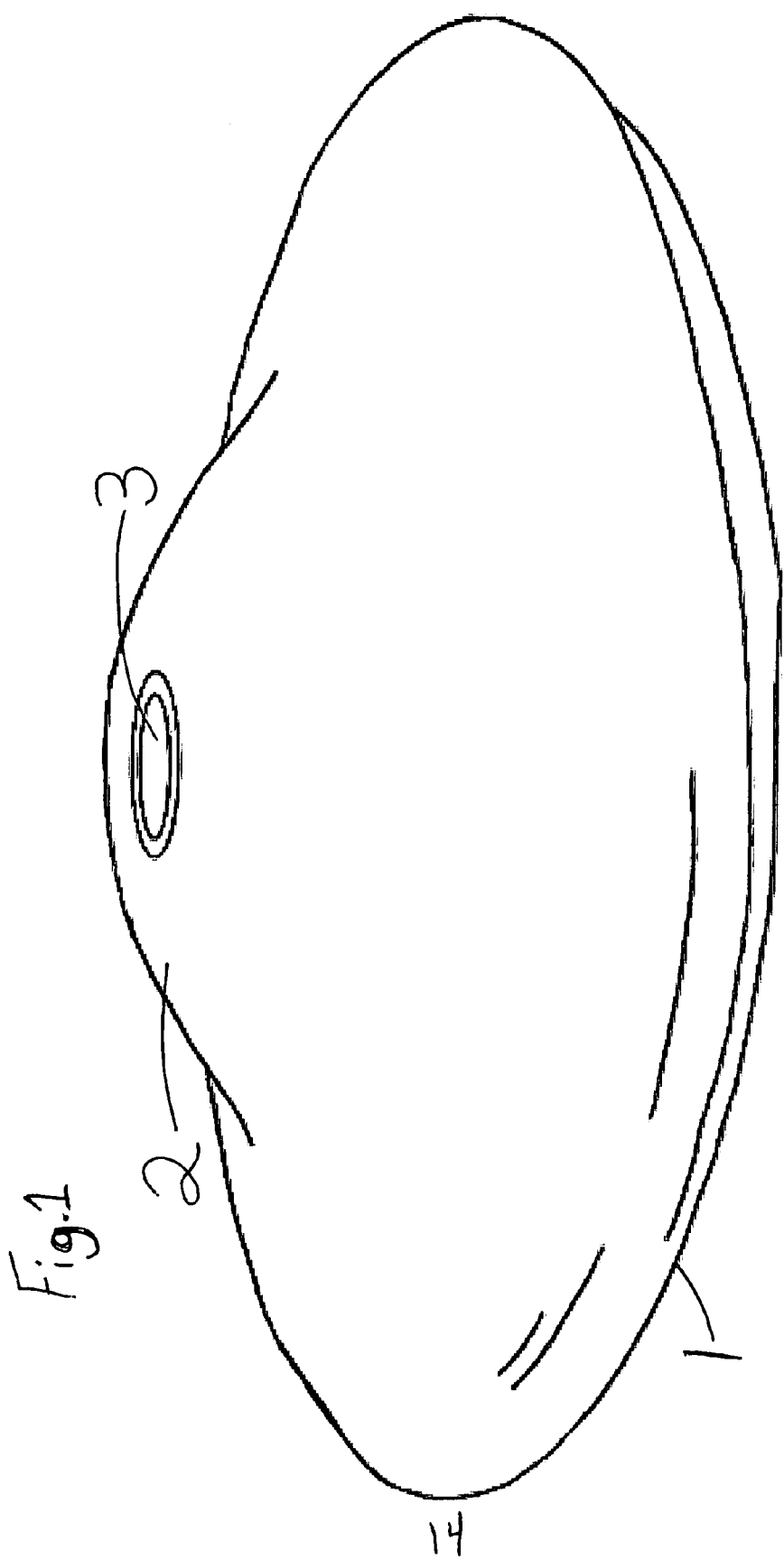
FIG. 1 is a perspective view of the Description of the Preferred Embodiment of the base.

The present invention will now be described in conjunction with the drawings beginning with;

FIG. 1, which depicts the Description of the Preferred Embodiment of the pet toy base 1. The base 1 comprising of a shape 2, on the upper section of the base 1, providing area for internal structures. The base 1 also depicts the entrance of the hollow shaft 3, where the shaft will insert within the shape 2 to the top of the external surface, depending on the size of the device due to the specifications of the target animal. This is necessary to provide rigidity for the shaft during interaction with the animal.

Figure 2:
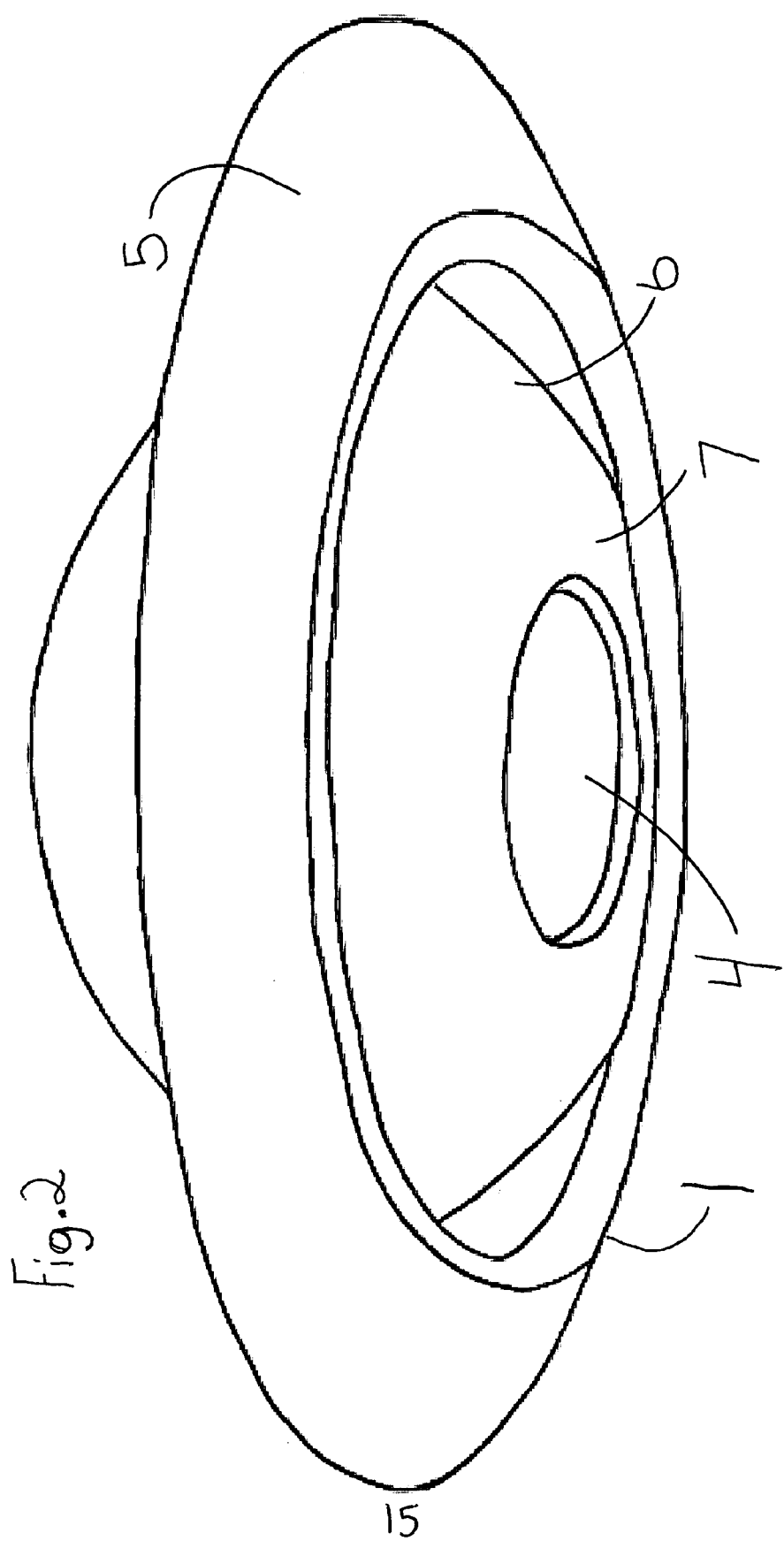
FIG. 2 is a lower view of the base to show the Description of the Preferred Embodiment of the distinct angles of the bottom of the base of the toy. (Lower view)

FIG. 2, which depicts a lower view of the Description of the Preferred Embodiment of the base 1, with the access to the interior section 4.

The angle of the outer edge 5 and the similar angle δ on the edge of the friction surface for the base 1, are essential for the proper function of the toy. The lower surface 7, is where the coefficient of friction can be adjusted due to added weight within the base. The exact weight or volume measurements can not be determined due to the personalization for each individual animal. With larger animals a larger base can be used to achieve the desired effect, and consequently for smaller animals a smaller base.

Figure 3:
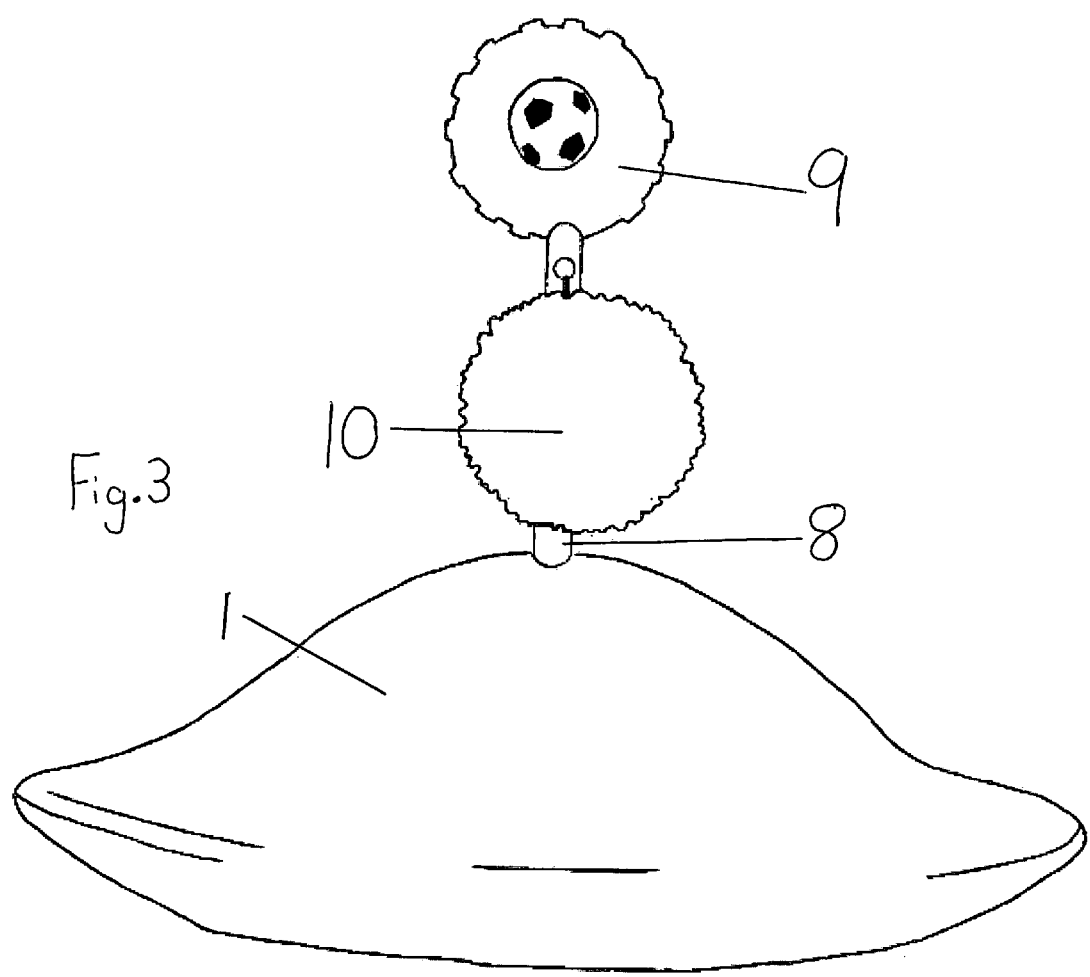
FIG. 3 is a profile of one embodiment of the pet toy with a "top piece" and toy attachment. (Stationary)

FIG. 3 is a profile of the Description of the Preferred Embodiment of the pet toy with base 1, hollow (adjustable) stem 8, "top piece" attachment 9, and a random interchangeable attachment 10. The view of the pet toy is in a state of rest. This is the position the toy will return to once interaction from an external source is removed or ceased. The attached toy is used only for demonstration purposes only and should not limit the scope of the invention.

Figure 4:
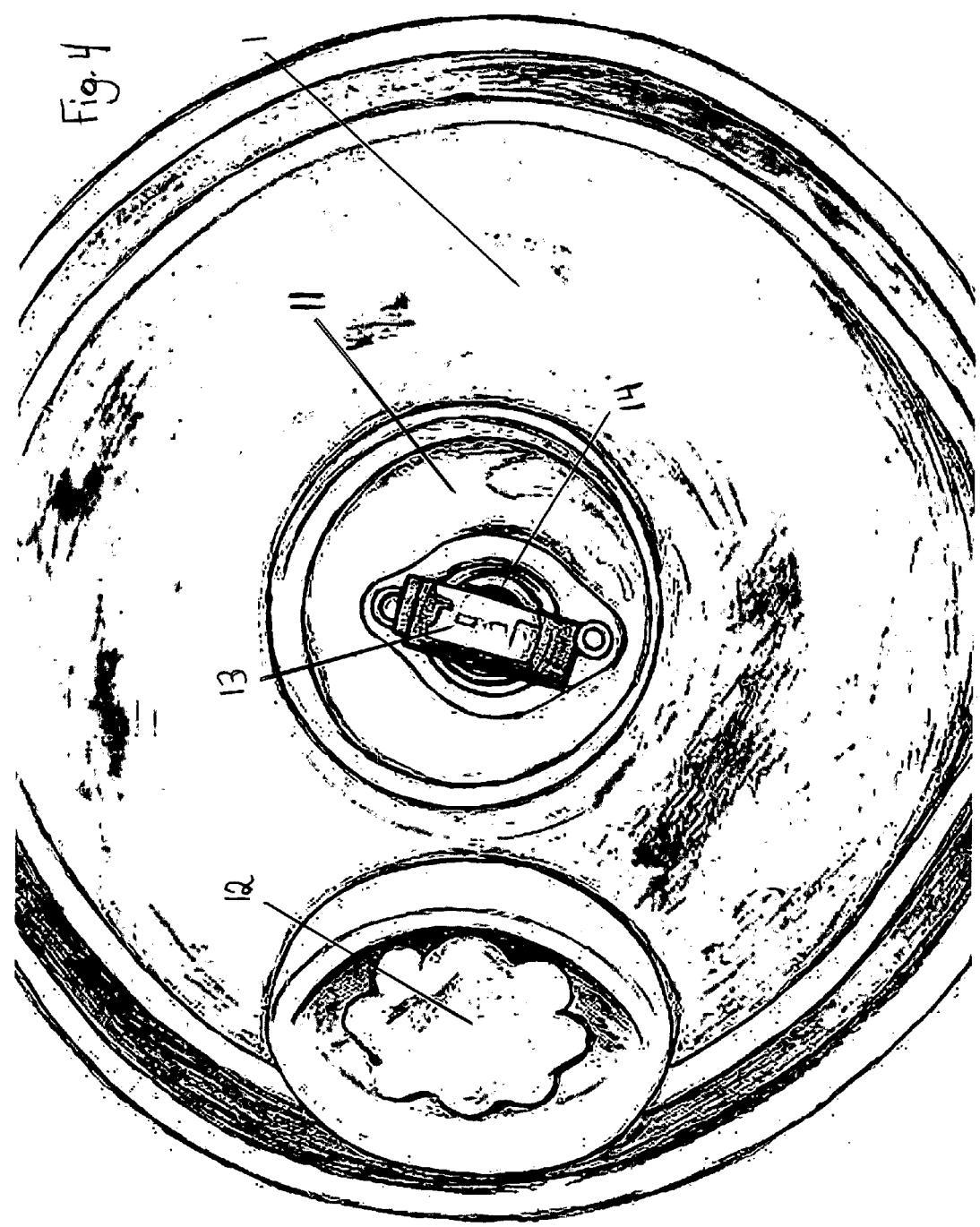
FIG. 4 is a view of the bottom of the base with the Description of the Preferred Embodiment of the access port to the interior of the base.

FIG. 4 is a view of the lower surface as in a Description of the Preferred Embodiment of the base, with the access to the interior section 11, and the covering 12 of said interior section. Within the base 1 is the retraction mechanism 13, wherein the animal has a tugging stimulus for exercise or entertainment. The hollow (adjustable) stem is anchored to the upper section of the base 1 securely. The rotating mechanics of the shaft are produced by the bearing system 14 attached to the base 1 and the hollow (adjustable) stem.

Figure 5:
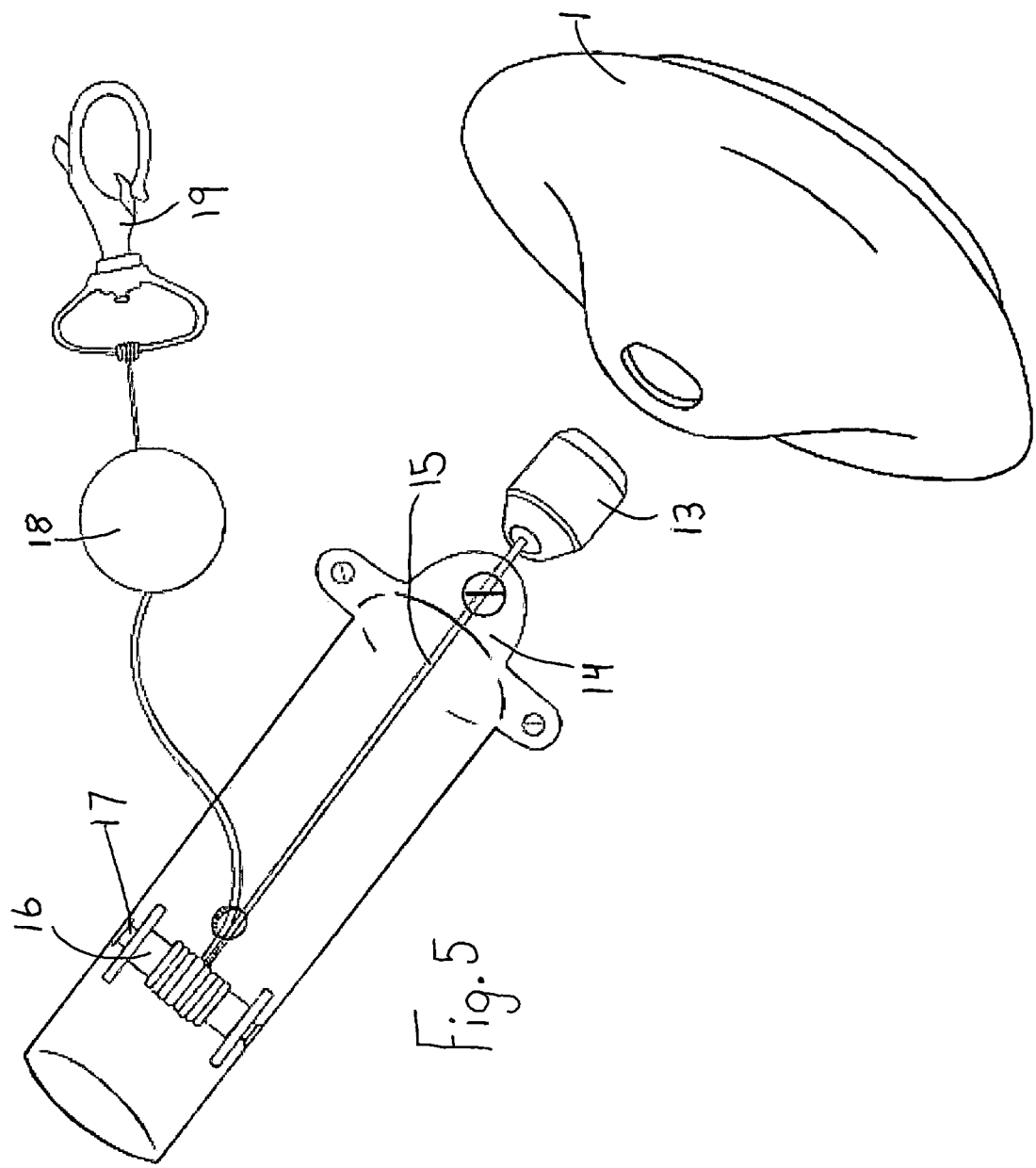
FIG. 5 is a drawing of one embodiment of the pulley system and the exit for the retraction cord.

FIG. 5 is a drawing of the Description of the Preferred Embodiment of the single pulley system within the hollow (adjustable) shaft of the device. The badge reel 13 located at the base of the stem, attached via the badge reel support bracket 14. The path of the retractable reel cord 15, let to the pulley wheel 16, supported by the pulley support rod 17. The retractable cord is led through the retraction limiter 18, to the hook attachment 19. Many other configurations can be used to attach the interchangeable stimulants as well as adjust the leverage and ultimate resistance of the retraction device by adding alternative reels or pulley configurations.

I claim:

1. An apparatus for entertaining, exercising, and playing with a pet comprising:
    a rigid hollow base of a specific shape, having a distinct top and bottom; an opening and cover on the bottom of said base;
    an internal base structure; an internal bladder; a rotating, hollow adjustable stem;
    a retraction mechanism secured within the hollow base or within the hollow adjustable stem;
    an adjustable hook is attached to the retraction mechanism where accessories and attachments can be connected to further encourage interaction;
    a pulley system; and a stem cover covering the top of the adjustable stem and inner mechanisms; and
    wherein when the pet pulls on an attachment secured to the retraction mechanism by the adjustable hook which is attached to a top section of the adjustable stem, said attachment will extend when pulled by the pet and fully retract when released, causing said attachment and base to be dragged, sway and rotate;
    combining to form a functional exercise, and entertainment device for animals.

2. The apparatus of claim 1, wherein the hollow base is accessible through a distinct opening sufficient for repair and to store items within the base.

3. The apparatus of claim 1, wherein the internal base is sufficient to house a bladder, able to hold a given amount of liquid, storage of extra toys, supplies, and a retraction mechanism.

4. The apparatus of claim 1, wherein the total weight of the apparatus is adjustable, due to the potential volume of at least one of the watertight bladder, unused toys, and supplies stored within the base.

5. An apparatus for entertaining, exercising, and playing with a pet comprising:
    a rigid hollow base of a specific shape, having a distinct top and bottom; an opening and cover on the bottom of said base;
    a durable, hollow adjustable stem connected to the top section of the rigid base into a circular recession on an outer top of the base being secured and made rigid;
    a retraction mechanism located within the hollow base or within the hollow adjustable stem;
    an adjustable hook is attached to the retraction mechanism where an animal's stimulant or attachment can be connected;
    a pulley system to act as a retraction cable guide;
    wherein when the pet pulls on an attachment secured to the retraction mechanism by the adjustable hook which is attached to a top section of the adjustable stem, said attachment will extend when pulled by the pet and fully retract when released, causing said attachment and base to be dragged, sway and rotate.

6. The apparatus of claim 5, wherein the hollow adjustable stem rotates while securely connected to the base.

7. The apparatus of claim 5, wherein an upper portion of the adjustable stem comprises an opening used for a retractor as a guide and a hub; said attachments being interchangeable and retractable attachments.

8. The apparatus of claim 5, wherein the retraction mechanism comprises a cord, and a flexible non-toxic fabric covers the cord of the retraction mechanism.

9. An apparatus for entertaining, exercising, and playing with a pet comprising:
    a rigid hollow base of a specific shape, having a distinct top and bottom; an opening and cover on the bottom of said base;
    a durable, hollow adjustable stem connected to the top section of the rigid base into a circular recession on an outer top of the base being secured and made rigid;
    a retraction mechanism located within the hollow base or within the hollow adjustable stem;
    an adjustable hook is attached to the retraction mechanism where an animal's stimulant or attachment can be connected;
    the retraction mechanism comprises a cord, and a flexible non-toxic fabric covers the cord of the retraction mechanism;
    a pulley system to act as a retraction guide for the cord;
    wherein when the pet pulls on an attachment secured to the retraction mechanism by the adjustable hook which is attached to a top section of the adjustable stem, said attachment will extend when pulled by the pet and fully retract when released, causing said attachment and base to be dragged, sway and rotate.

10. An apparatus for entertaining, exercising, and playing with a pet comprising:
    a rigid hollow base of a specific shape, having a distinct top and bottom; an opening and cover on the bottom of said base;
    a durable, hollow adjustable stem connected to the top section of the rigid base into a circular recession on an outer top of the base being secured and made rigid;
    a retraction mechanism located within the hollow base or within the hollow adjustable stem;
    an adjustable hook is attached to the retraction mechanism where an animal's stimulant or attachment can be connected;
    the retraction mechanism comprises a cord, and a flexible non-toxic fabric covers the cord of the retraction mechanism;
    a pulley system to act as a retraction guide for the cord; the pulley system mounted within a superior section of the hollow adjustable stem; and
    wherein when the pet pulls on an attachment secured to the retraction mechanism by the adjustable hook which is attached to a top section of the adjustable stem, said attachment will extend when pulled by the pet and fully retract when released, causing said attachment and base to be dragged, sway and rotate.

11. An apparatus for entertaining, exercising, and playing with a pet comprising:

a rigid hollow base of a specific shape, having a distinct top and bottom; an opening and cover on the bottom of said base;

a durable, hollow adjustable stem, having inner mechanisms, connected to the top section of the rigid base into a circular recession on an outer top of the base being secured and made rigid;

a retraction mechanism located within the hollow base or within the hollow adjustable stem;

an adjustable hook is attached to the retraction mechanism where an animal's stimulant or attachment can be connected to further encourage interaction;

the retraction mechanism comprises a cord, and a flexible non-toxic fabric covers the cord of the retraction mechanism;

a pulley system is mounted within a superior section of the hollow adjustable stem; a stem cover consisting of a nontoxic material used to cover the inner mechanisms of the adjustable stem and wherein when the pet pulls on an attachment secured to the retraction mechanism by the adjustable hook which is attached to a top section of the adjustable stem, said attachment will extend when pulled by the pet and fully retract when released, causing said attachment and base to be dragged, sway and rotate.

12. The apparatus of claim 11, wherein the superior section is securely attached to the adjustable stem.

13. The apparatus of claim 11, wherein the adjustable hook is made of a durable material and is attached to the cord of the retraction mechanism securely.

* * * * *